United States Patent [19]
Chludek

[11] Patent Number: 5,979,624
[45] Date of Patent: Nov. 9, 1999

[54] DEVICE USING VISCOUS SHEAR TO CONTROL A COUPLING WHICH LIMITS TORQUE TRANSFERABLE THERETHROUGH

[75] Inventor: Adrian Chludek, Sankt Augustin, Germany

[73] Assignee: GKN Viscodrive GmbH, Lohmar, Germany

[21] Appl. No.: 08/857,407

[22] Filed: May 16, 1997

[30] Foreign Application Priority Data

May 17, 1996 [DE] Germany ............... 196 19 891

[51] Int. Cl.⁶ ............... F16D 25/0638; F16D 43/284
[52] U.S. Cl. ............... 192/35; 192/85 AA; 192/103 F; 192/55.1
[58] Field of Search ............... 192/35, 57, 85 AA, 192/103 F, 56.31, 55.1, 58.42, 58.43; 464/30, 45, 47

[56] References Cited

U.S. PATENT DOCUMENTS

| 3,201,953 | 8/1965 | Firth ................... 464/46 |
| 5,526,912 | 6/1996 | Gassmann . |
| 5,690,201 | 11/1997 | Gassmann . |

FOREIGN PATENT DOCUMENTS

| 4327519 | 2/1995 | Germany . |
| 4343307 | 6/1995 | Germany . |
| 4424255 | 1/1996 | Germany . |
| 19505800 | 8/1996 | Germany . |
| 1242833 | 9/1989 | Japan . |
| 272823 | 6/1990 | Japan . |
| 298225 | 8/1990 | Japan . |
| 2140036 | 11/1990 | Japan . |
| 7197954 | 8/1995 | Japan . |
| 7323742 | 12/1995 | Japan . |
| 2284869 | 6/1995 | United Kingdom . |
| 2309497 | 7/1997 | United Kingdom . |

*Primary Examiner*—Charles A. Marmor
*Assistant Examiner*—Ankur Parekh
*Attorney, Agent, or Firm*—Howard & Howard

[57] ABSTRACT

A coupling device with two parts which are coaxially rotatable relative to one another, comprising a friction coupling whose friction plates are alternately connected to each of the rotatable parts. Further the coupling device comprises an actuating device for the friction coupling, which comprises an annular chamber formed in one of the rotatable parts and containing a highly viscous fluid. A rotational chamber is arranged in the annular chamber and is drivingly connected to the other one of the rotatable parts. The actuating device, when the rotatable parts rotate relative to one another, causes an increase in pressure for the purpose of loading the friction coupling.

9 Claims, 10 Drawing Sheets

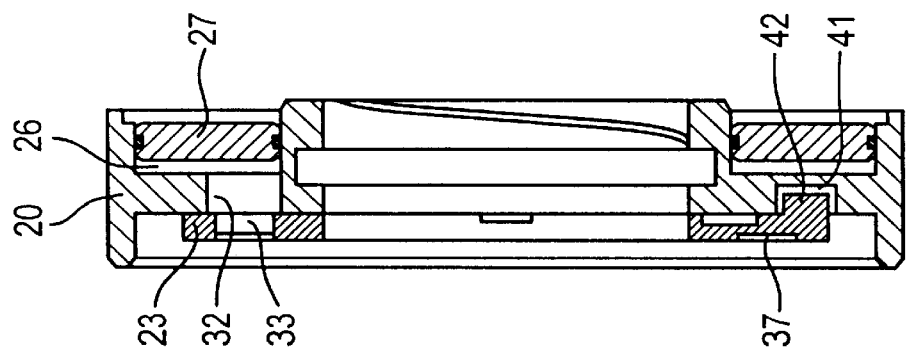
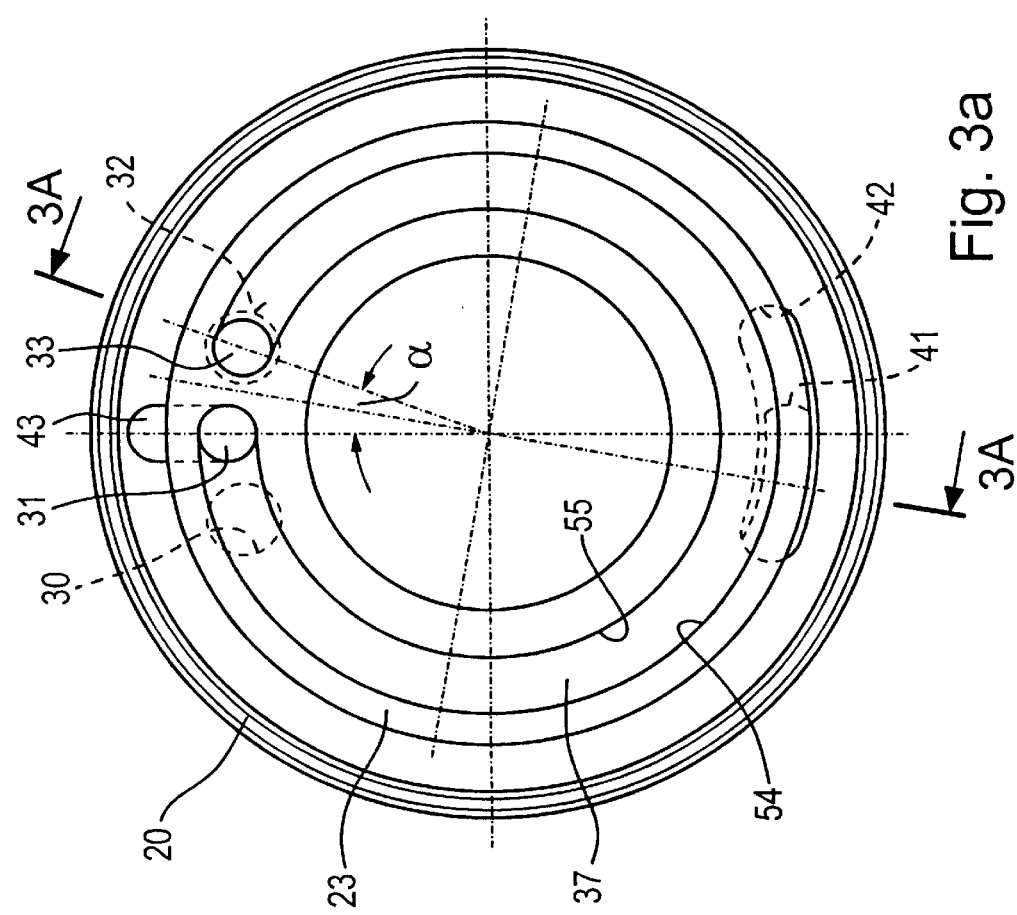
Fig. 3b
Fig. 3a

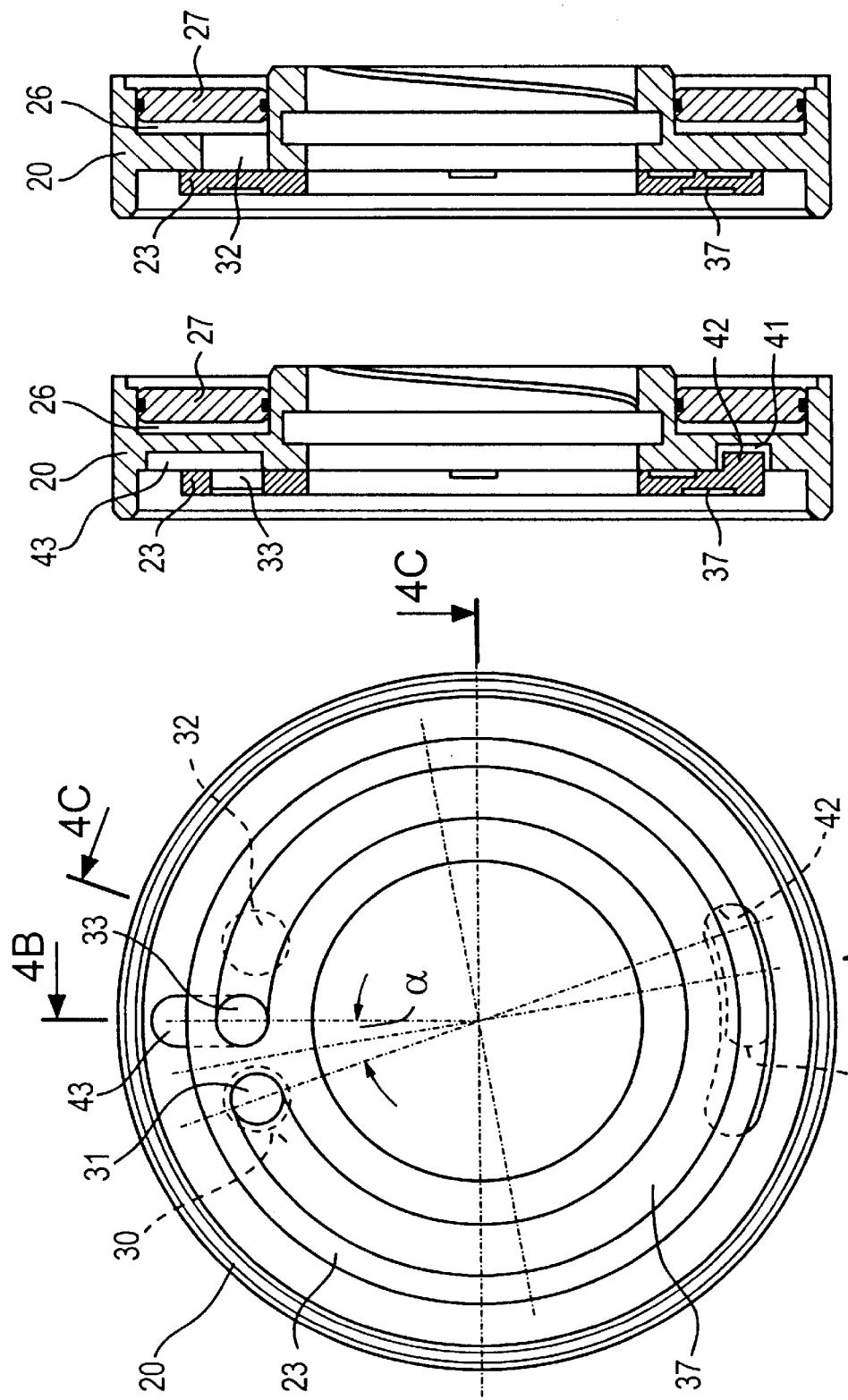

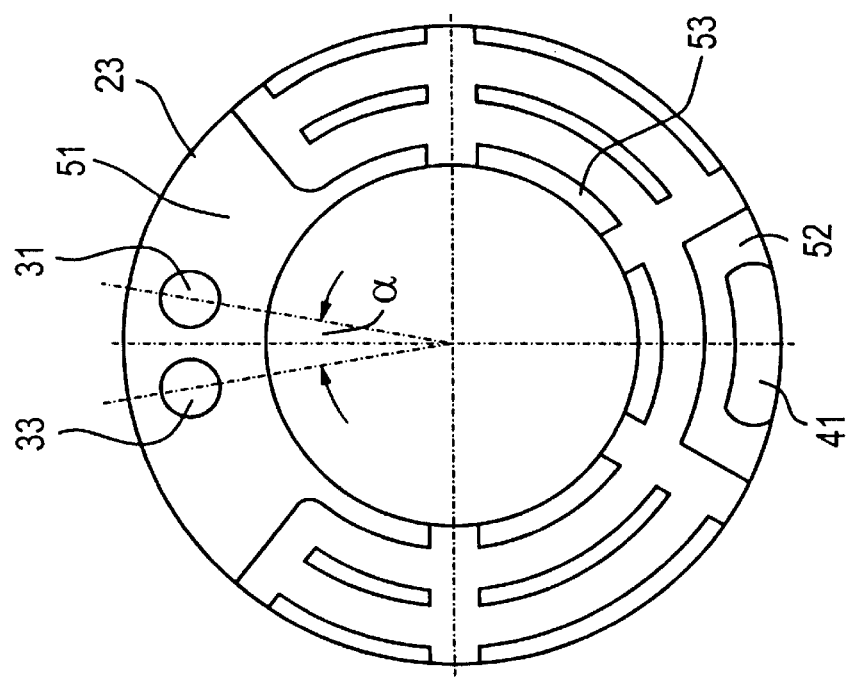
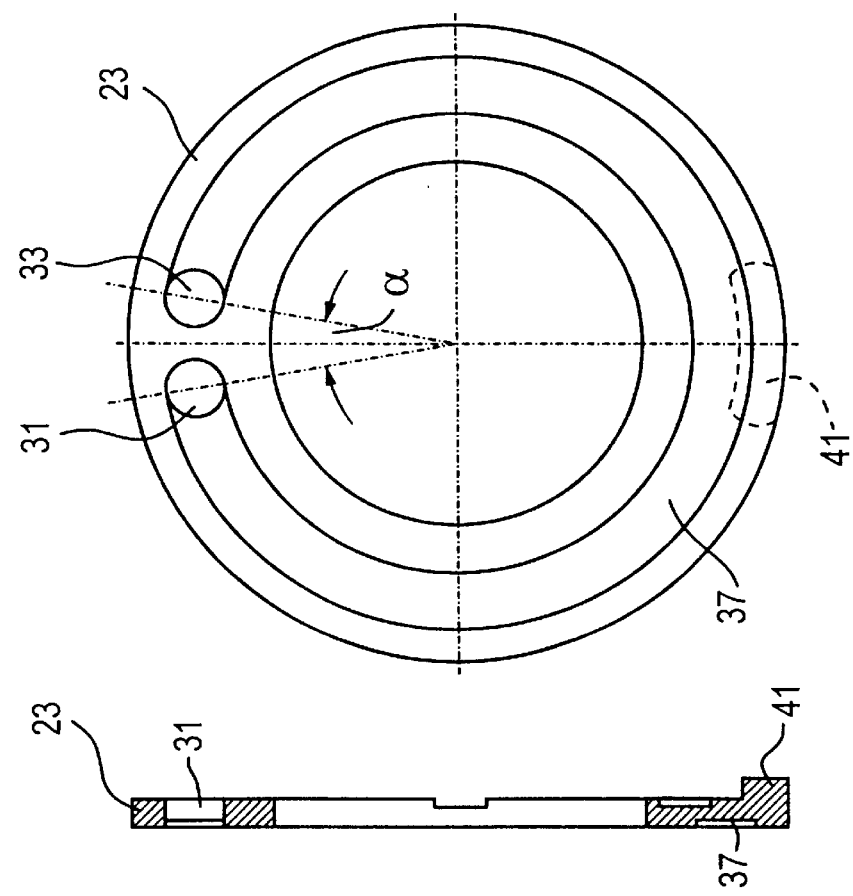
Fig. 5c
Fig. 5b
Fig. 5a

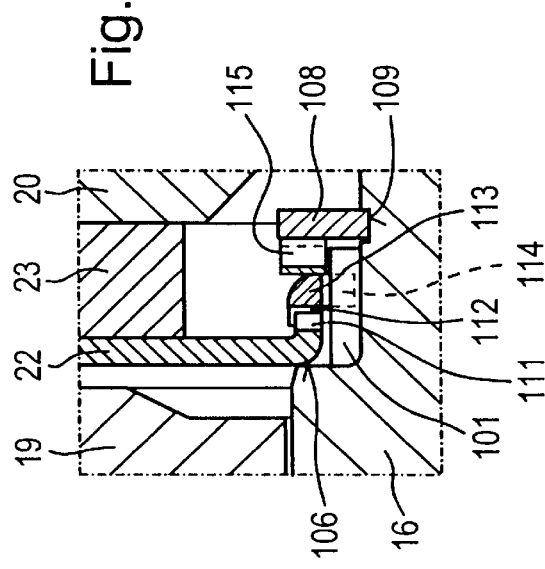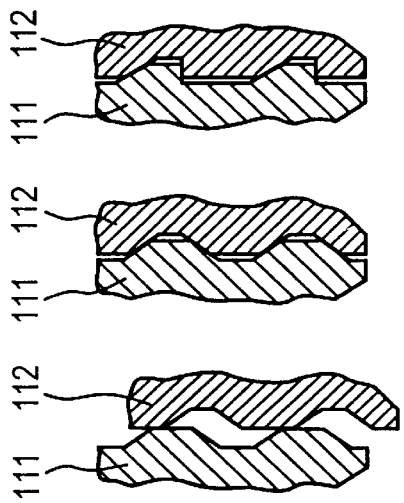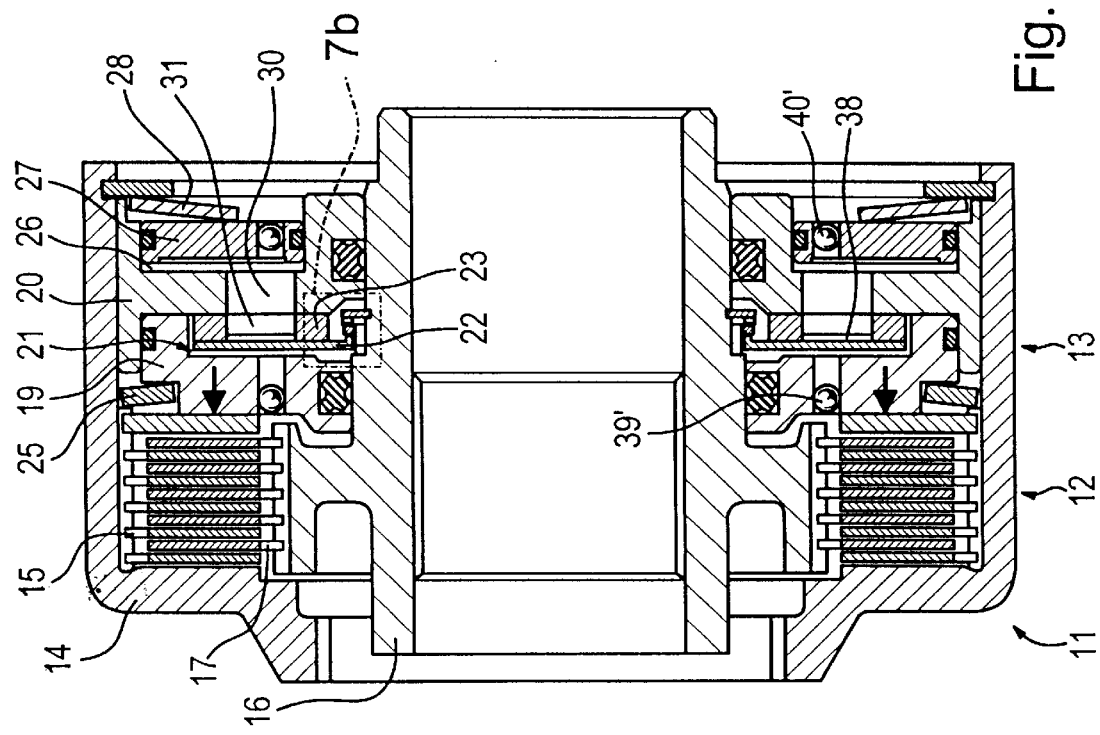

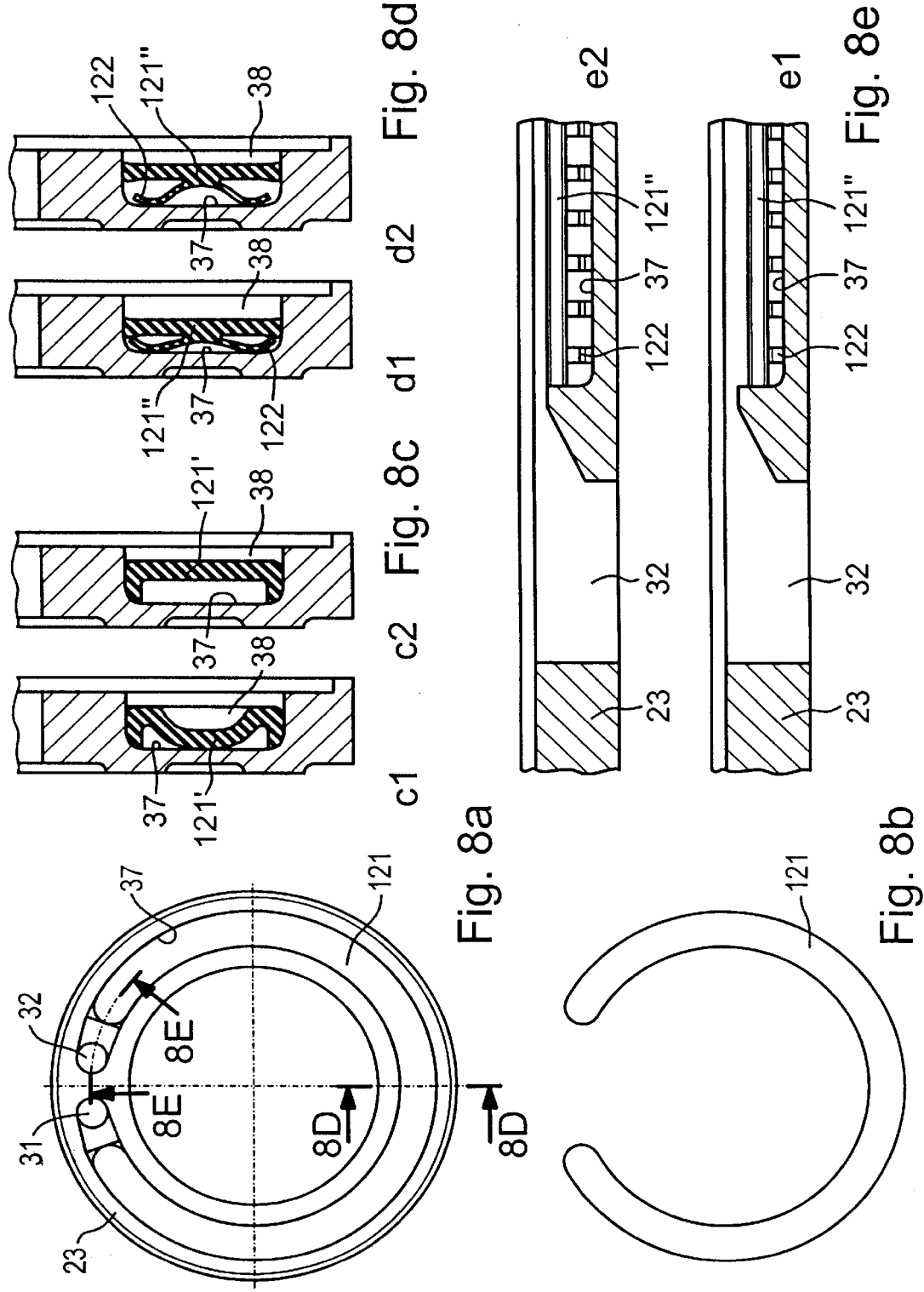

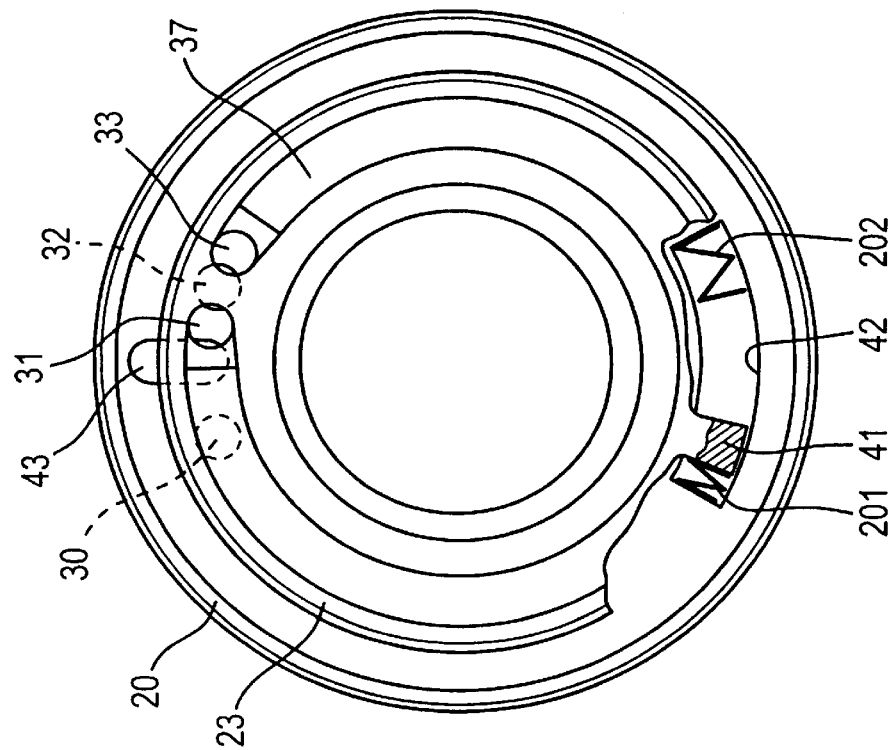
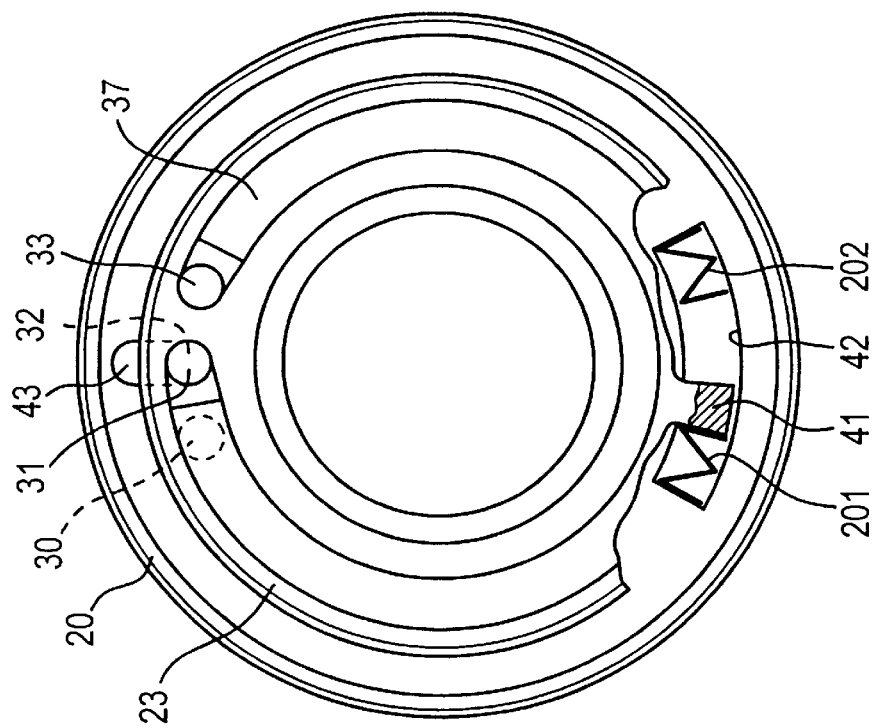
Fig. 9b
Fig. 9a

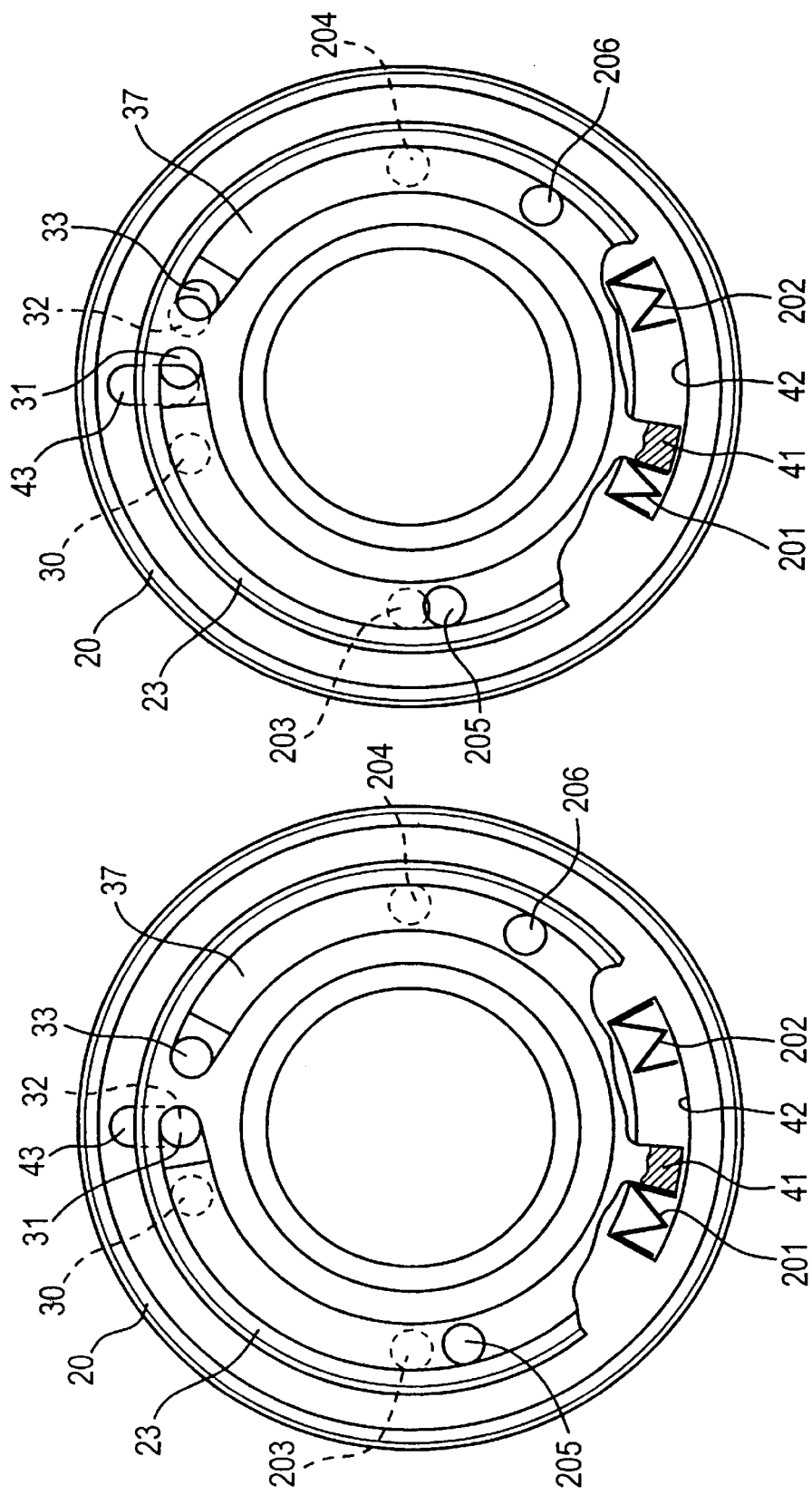

DEVICE USING VISCOUS SHEAR TO CONTROL A COUPLING WHICH LIMITS TORQUE TRANSFERABLE THERETHROUGH

BACKGROUND OF THE INVENTION

The invention relates to a coupling device with two parts which are coaxially rotatable relative to each other. The invention comprises a friction coupling whose friction plates are alternately connected to the parts which rotate relative to each other, and an actuating device for the friction coupling. The actuating device comprises an annular chamber formed in one of the parts, which contain a highly viscous fluid and the actuating device comprises a rotational member arranged in the annular chamber, drivingly connected to one of the parts, and which acts on the adhering fluid. The actuating device, when the rotatable parts rotate relative to each other, causes an increase in pressure for the purpose of loading the friction coupling.

When the rotatable parts of the coupling rotate relative to each other, the shearing action in the highly viscous fluid causes a pressure to be built up in the annular chamber. The pressure axially loads the friction plates of the friction coupling which thus have the tendency to close the coupling.

Devices of this type are used in motor vehicles and agricultural machinery to generate a differential-speed-dependent locking moment between two parts rotating relative to one another.

The two rotating parts may be parts of a differential drive or they may be connected to such parts of a differential drive. By using such an assembly in a differential drive, a limited slip differential which locks, i.e., has its differential action inhibited, as a function of the differential speed is produced.

A coupling device of said type is known from JP 7-17162 Y2 for example, wherein the rotational member is connected, so as to be rotationally fixed, to one of the relative rotating parts. One of the parts forms an annular chamber which is delimited by a displacable piston loading the friction coupling. With an increasing differential speed, the pressure build-up generated in the viscous fluid increases and causes the displacement of the piston.

A device of this type is also known from DE 195 05 800.3 wherein, for the purpose of limiting the pressure generated in the annular chamber, there exists a short circuit line between the annular chamber and reservoir. The short circuit line opens as a function of the pressure. However, the pressure-dependent control system can pass on the speed differential only indirectly. Thus, there may be interference due to the temperature of the viscous fluid. The channels required for the short circuit line, also render the device more expensive.

It is therefore the object of the present invention to provide a differential speed sensing coupling of this type which comprises simplified torque limiting means and which, in particular, do not require any additional housing bores.

SUMMARY OF THE INVENTION

The first solution is achieved by providing a coupling characterized in that there are provided means for uncoupling the connection between the rotational member and the one of the rotatable parts which drives the rotational member, for limiting the torque transmittable between the two parts.

Such means make it possible, with an increasing relative speed, to decouple the speed of the rotational member from the speed of the one of the parts to which it is connected. Therefore, it is possible to limit the generation of pressure determined by the relative speed between the rotational member and the annular chamber. Depending on the design of the embodiment, it is possible to limit the value to a maximum value and also to achieve digressive curves which, from a certain relative speed onwards, ensure that the generation of pressure no longer increases substantially. The generation of pressure in the pressure chamber can be adjusted, especially taking into account certain mechanical pretension values, such that the friction coupling is not closed completely, but remains in the condition of slip. Preferred decoupling means are for example slip couplings or claw couplings between the one of the rotating parts and the rotational member. It is also possible to use a viscous couplings with just a few coupling plates. Further embodiments are mentioned in the sub-claims to which reference is made hereby.

The actuating device for the friction coupling itself is characterized in a preferred embodiment in that inside the annular chamber there is arranged a pressure build-up and control member which is rotatable relative to said annular chamber to a limited extent. The member is provided with a circumferentially extending annular groove delimited by two ends, which is closed by the contacting rotational member and which forms a shear channel with said rotational member. The annular chamber is delimited by a movable piston. In one of the rotatable parts, there is formed a reservoir with a variable volume hydraulically connected to the annular chamber. Upon relative rotation of the rotatable parts, one end of the shear channel with a lower fluid pressure is connected to the reservoir and the other end of the shear channel with a higher fluid pressure is connected to the part of the annular chamber which is delimited by the movable piston.

A second solution is achieved in that inside the annular chamber there being means for increasing the size of the shear gap of the shear channel between the rotational member and a delimiting wall of the shear channel. Furthermore, there is a difference compared to the solution mentioned first in that there is provided a rotationally fixed connection between the rotational member and the respective part of the two rotatable parts. The means for increasing the size of the shear gap, (i.e. for increasing its thickness), have the same effects as the previously discussed decoupling means, (i.e. as the shear gap increases, the pressure build-up in the shear channel decreases or is limited), in spite of the increase in the relative speed. Thus, in this case, too, from a certain relative speed onwards, there is achieved a maximum value of the pressure generated or the further increase in pressure generation becomes greatly digressive. The pressure forces acting on the friction coupling are limited accordingly, so that the coupling can be held in a condition of slip. The preferred means are resilient wall parts in the annular chamber which are controlled as a function of pressure or externally.

The actuating device for the friction coupling itself is characterized in a preferred embodiment in that inside the annular chamber there is arranged a pressure build-up and control member which is rotatable relative to said annular chamber to a limited extent. The member has a circumferentially extending annular groove delimited by two ends, which is closed by the contacting rotational member and which forms a shear channel with said rotational member. The annular chamber is delimited by a movable piston. In one of the rotatable parts, there is formed a reservoir with a variable volume which is hydraulically connected to the annular chamber. Upon relative rotation of the rotatable parts, one end of the shear channel with a lower fluid pressure is connected to the reservoir, and the other end of the shear channel with a higher fluid pressure is connected to the part of the annular chamber which is delimited by the movable piston. The pressure build-up and control member which is rotatable to a limited extent is held between two elastically resilient end stops which, when a given differential speed between the rotatable parts is exceeded, as a result of being elastically resilient, ensure further rotation of the pressure build-up and control member and thus a release of a short circuit connection between the end of the shear channel with the higher pressure and the end of the shear channel with the lower pressure.

Depending on the desired curve of the locking moment generated by the friction coupling as a function of the differential speed, it is possible to correct the forces generated in the annular chamber. For this purpose it is possible to provide spring means supported on the housing and which load the plates on the side facing the piston, or to provide spring means which are supported on the housing and load the piston on the side facing the plates, or to provide spring means which are arranged in a pretensioned condition between the piston and the friction coupling while continuously loading the latter with a minimum force.

The reservoir may be formed by the rotational housing and an axially movable spring-loaded piston rotating with the rotational housing, or by a spring-loaded membrane, or it may comprise a resilient compensating element in a chamber forming the reservoir. The highly viscous fluid contained therein may be a dilatant fluid for example, i.e. a medium whose viscosity increases as a function of the shear rate.

BRIEF DESCRIPTION OF THE DRAWINGS

To explain the operating principle and preferred embodiments of the invention, reference is made to the drawings wherein

FIG. 3a is a view of the first embodiment of a pumping and control disc with a rotational member;

FIG. 3b is a cross-sectional view taken along line 3A—3A of FIG. 3a, in the form of a detail in a first position;

FIG. 4a is a view of the pumping and control disc and the rotational member according to FIG. 3;

FIG. 4b is a cross-sectional view taken along line 4B—4B of FIG. 4a;

FIG. 4c is a cross-sectional view taken along line 4C—4C of FIG. 4a in a third position;

FIG. 5a is a side view of a pumping and control disc;

FIG. 5b is a front view of a pumping and control disc;

FIG. 5c is a rear view of a pumping and control disc;

FIG. 7a is an inventive coupling in a second embodiment with a pressure-loaded claw coupling in a longitudinal section;

FIG. 7b is an enlarged view of an inventive coupling in a second embodiment with a pressure loaded claw coupling;

FIG. 7c is an illustration of two different tooth shapes of a pressure-loaded claw coupling;

FIG. 8a is an axial view of an inventive pumping and control disc;

FIG. 8b is an inventive pumping and control disc with a compensating member;

FIG. 8c is an enlarged cross-section taken along line 8D—8D of FIG. 8a through the shear channel in a first embodiment;

FIG. 8d is an enlarged cross-section taken along line 8D—8D of FIG. 8a through the shear channel in a second embodiment;

FIG. 8e is an enlarged cylindrical portion through the longitudinal channel in two positions of the closing member taken along line 8E—8E of FIG. 8a;

FIG. 9a shows a conveyor disc with an associated pumping and control disc in a first conveying position;

FIG. 9b is a conveyor disc with an associated pumping and control disc in a second short circuited position;

FIG. 10a shows a conveyor disc with an associated pumping and control disc in a first conveying position; and FIG. 10b is a conveyor disc with an associated pumping and control disc in a second short circuit position.

DETAILED DESCRIPTION OF THE DETAILED DESCRIPTION

Figure 1:
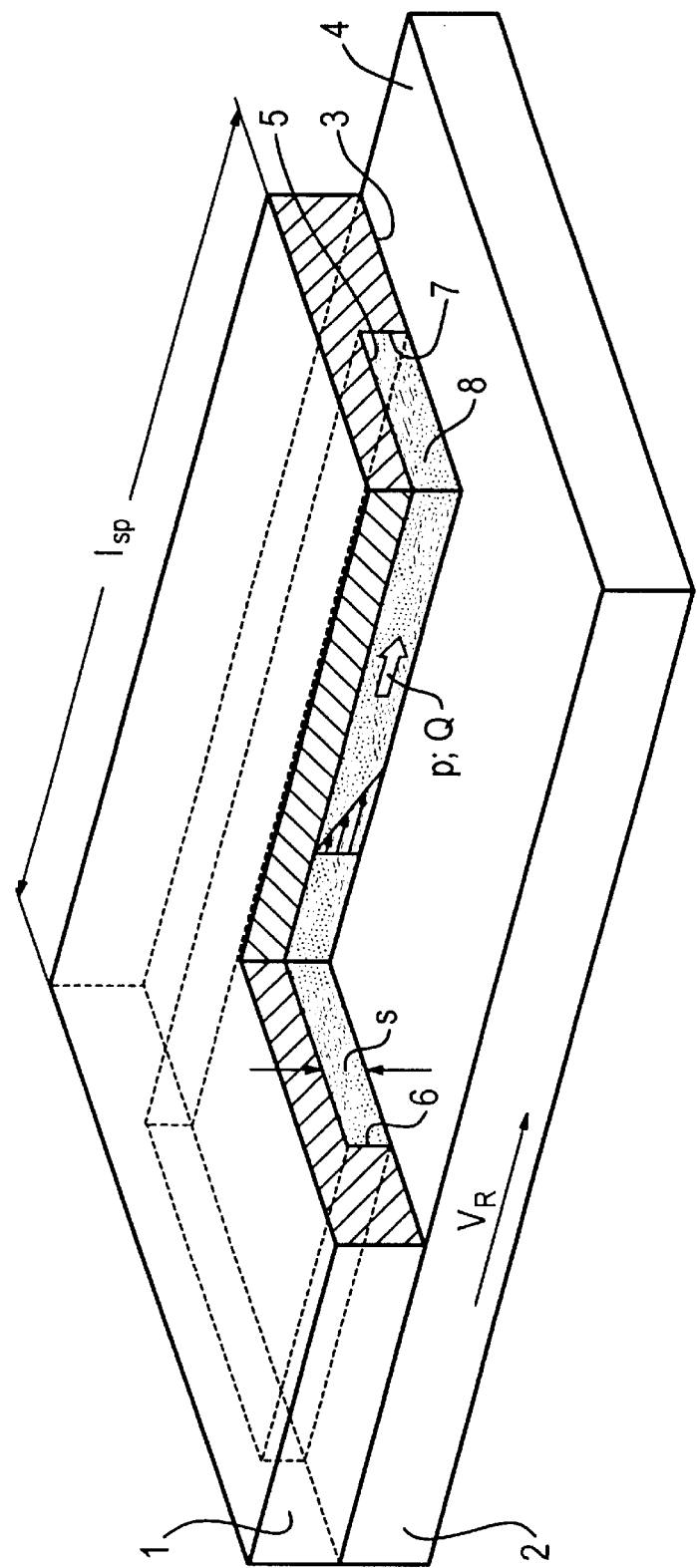
FIG. 1 shows two plates which are movable relative to one another, with part of the plates being cut out, and with a groove constituting a shear channel being formed in one of the plates.

FIG. 1 shows a cut-out illustration of a first plate or disc 1 and a second plate or disc 2 whose end faces 3, 4 contact one another. The first plate 1 is assumed to be fixed, with the second plate 2 moving relative to the first plate 1 at the speed $V_R$. Groove 5 is formed in the end face 3 of the first plate 1. The groove 5 has a cross-section which is rectangular and which, at its sides, comprises two delimiting walls 6, 7. The groove 5 and end face 3 form a shear channel 8 which receives a viscous medium. The shear channel element comprises the length $l_{sp}$ and the height or thickness s. When the plate 2 moves, the medium in the shear channel behaves in accordance with the given linear speed profile which refers to the fixed plate 1. The surfaces are each subject to adhesion conditions, both as regards the plate 1 and the plate 2, i.e. with reference to the plate 2, the speed profile would be reciprocal. With reference to the plate 1, the shearing action in the shear channel results in a pressure p and a quantity flow Q.

As the applications shown here do not refer to relative linear movements but to relative rotational movements, the groove 5 forming the shear channel 8 preferably extends circumferentially, as shown in FIGS. 2 to 10.

Figure 2:
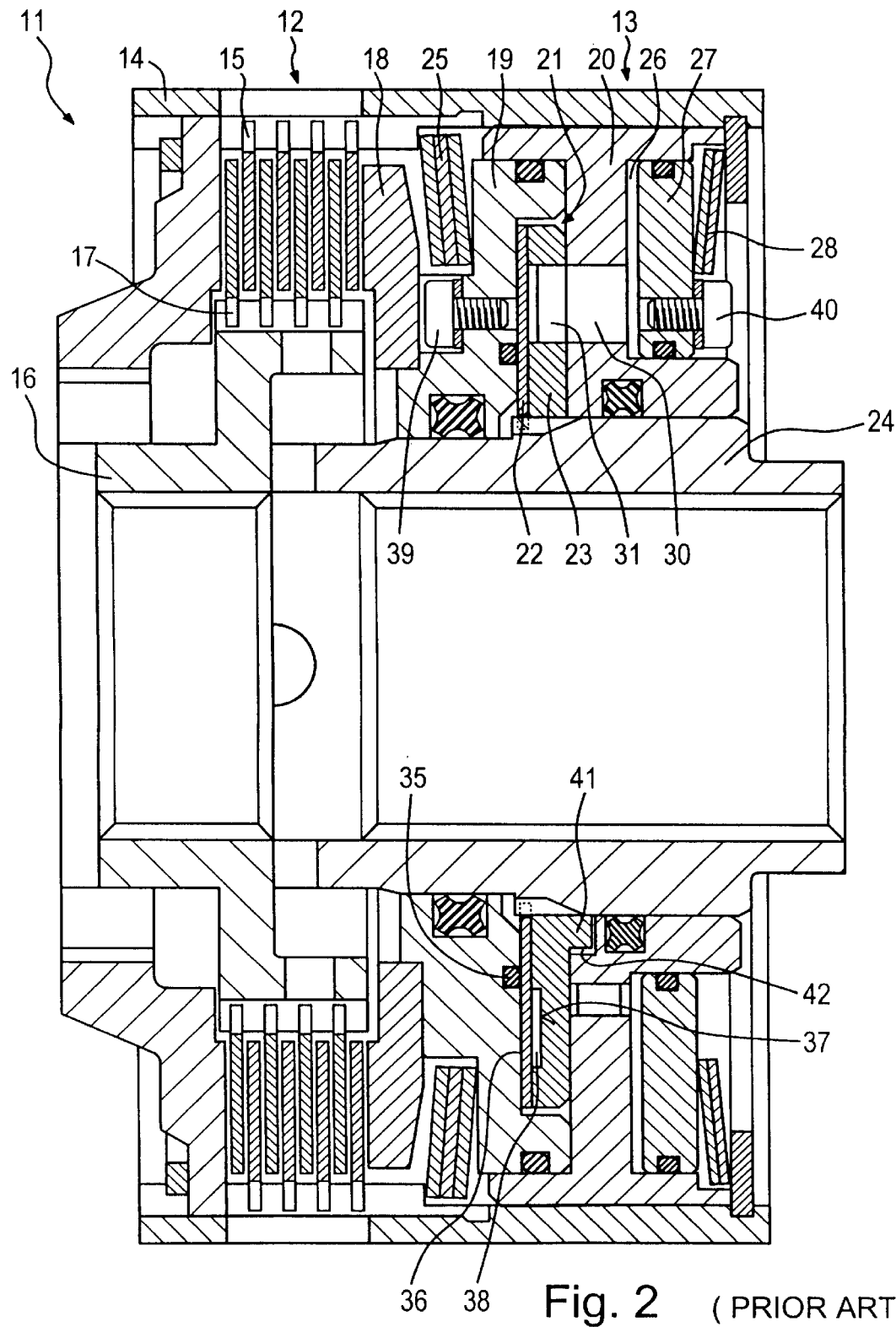
FIG. 2 is half a longitudinal view of a coupling of the prior art.

FIG. 2 shows a coupling assembly generally indicated at 11 which comprises a controllable friction coupling 12 in the form of a multi-plate coupling and a speed-sensing control assembly 13. The friction coupling comprises a housing 14 in which outer plates 15 are held so as to be rotationally fixed, as well as a hub 16 on which there are arranged inner plates 17 so as to be rotationally fixed. The friction coupling is loadable by means of a piston 19 which forms part of the control assembly 13 which is arranged in the housing 14 and comprises the axially movable piston 19 and a rotational housing 20, which two parts rotate with the housing 14. Both together form a pressure chamber 21 which contains a disc-shaped rotational member 22 and a disc-shaped pumping and control member 23. The rotational member 22 is connected to the hub 16 so as to be rotationally fixed, with the hub 16 being driven. By means of a rotational stop (not illustrated) which engages a circumferential groove (not illustrated) in the rotational housing 20, the pumping and control member 23 is rotatable relative to the rotational housing 20 to a limited extent. An O-ring arranged in the piston 19 serves as spring means 35, thus ensuring close contact between the rotational member 22 and the pumping and control member 23.

When the rotational member 22 driven by the hub 16 via toothing means changes its direction of rotation, it moves the pumping and control member 23 from its one end position determined by a rotational stop and circumferential groove into the other end position determined by the rotational stop and circumferential groove. Furthermore, the rotational housing 20 contains a reservoir 26 which is delimited by an axially movable annular piston 27. The latter is supported by plate springs 28 on the housing 20, so that the reservoir 26 always compensates for changes in volume in the pressure chamber 21. The rotational housing 20 is shown to have an axial connecting channel 30 which, in the circumferential position illustrated, overlaps with a control aperture 31 in the pumping and control member 23. The control aperture 31 is positioned at one end of the shear channel 38 which is formed by a circumferentially delimited groove in the pumping and control member 23 and by the surface of the rotational member 22. The parts rotating relative to one another are sealed relative to one another by seals. The gap between the rotational member 22 and the piston 19 radially outside the O-ring 35 has to be regarded as part of the pressure chamber 21. The screws 39, 40 serve to fill and ventilate the pressure chamber 21 and the reservoir 26. Plate springs 25 are supported on the housing 14 and act on the piston 19 in that they form a counter force relative to the effect of the pressure chamber 21.

FIGS. 3a and 3b illustrate a rotational housing 20 and a pumping and control member 23. The view shows the circumferentially extending groove 37 which is delimited by side walls 54, 55 and at whose ends there are provided control apertures 31 and 33. The control aperture 33 shown in section is located above the connecting channel 32 in the rotational housing 20. The control aperture 31 located at the other end overlaps with a radial connecting channel 43 (not shown in the section) in the rotational housing 20. The position of a further through-aperture 30 in the rotational housing 20 is shown in dashed lines. Dashed lines in FIGS. 3a and 3b indicate the rotational stop 41 arranged on the reverse side of the pumping and control member 23 and the circumferentially delimited groove 42 which limits the rotation of the pumping and control member 23 relative to the rotational housing 20.

FIGS. 4a, b and c show the same details as FIGS. 3a and b. However, the rotational stop 41 has assumed the opposed end position in the circumferentially delimited groove 42. Now the control aperture 31 overlaps with the second connecting aperture 30 leading to the reservoir 26, whereas the second control aperture 33 is connected to the connecting channel 43 leading to the pressure chamber 21. The pressure build-up now takes place at the end of the groove 37 at the control aperture 33. Dashed lines in the plan view indicate the position of the first connecting channel 32 leading to the reservoir 26, which in this case has no function.

FIGS. 5a, 5b and 5c show a pumping and control member 23 of the type already described above, with the control apertures 31, 33 and the groove 37 as well as the rotational stop 41 also being identifiable.

On the reverse side it is possible to identify a surface region 51 which comprises the control apertures 31, 33 and which is designed in such a way that, depending on its position, it is able to rest sealingly on the connecting channels 30, 32, 43, 47. The surface region 51 is circumferentially delimited such that, depending on its position, it is able alternately to open or close the throttle bore 49 as shown in FIG. 8. The remaining surface, on its reverse side, comprises a plurality of annular ribs 53 in order to reduce friction and adhesion relative to the housing. A surface 52 positioned opposite the surface 51 carries the rotational stop 41 projecting beyond said surface.

Figures 6A, 6B:
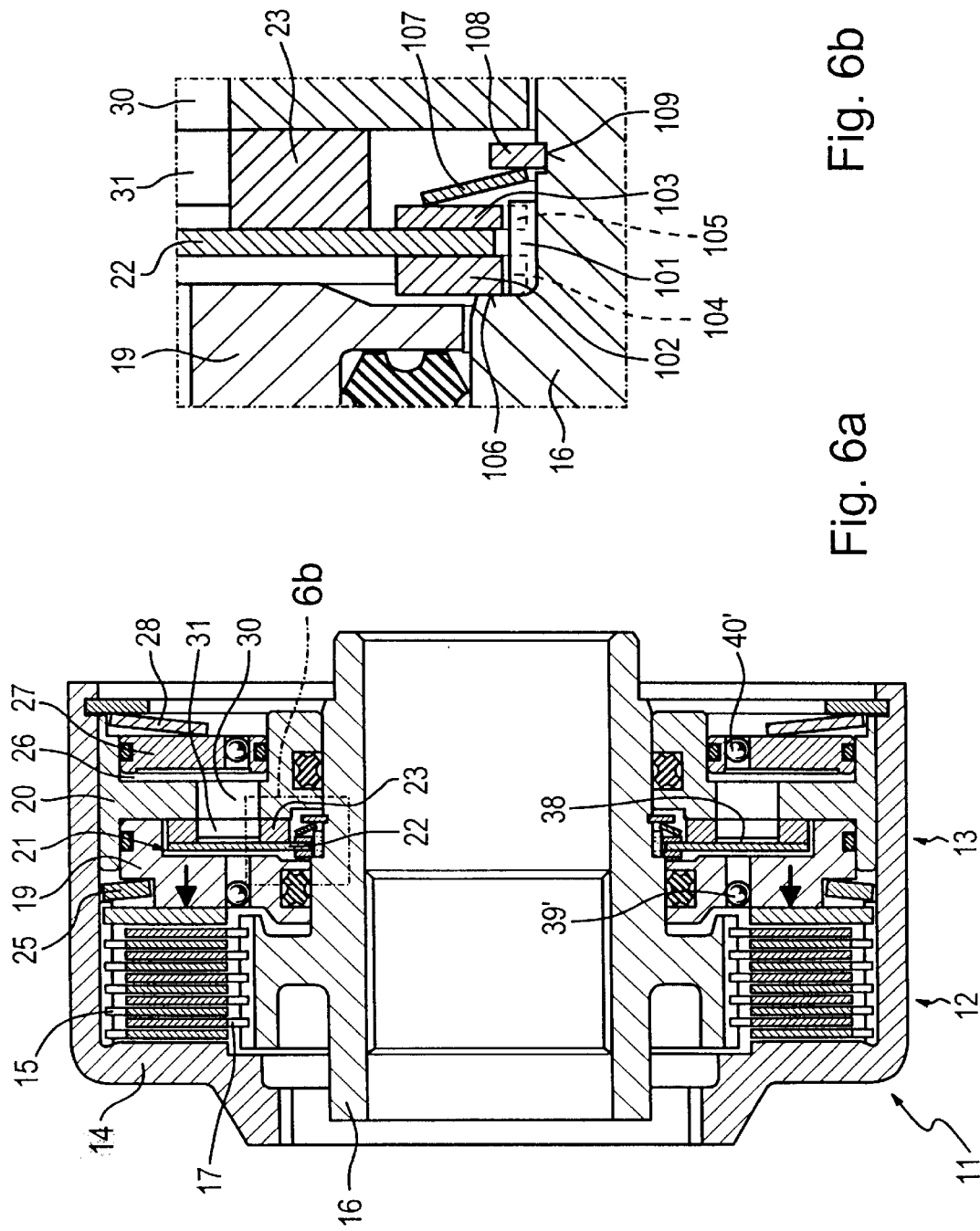
FIG. 6a is a longitudinal view of an inventive coupling with a slip coupling at the pumping and control disc.
FIG. 6b is an enlarged view of an inventive coupling with a slip coupling at the pumping and control disc.

FIGS. 6a and 6b shows the same details as FIG. 2. Instead of screws there are provided balls 39', 40' constituting the closing means. In this embodiment, the rotational member 22 is not directly coupled to the hub 16 in a rotationally fixed way; instead, it is clamped in a friction locking way between two driving discs 102, 103. The driving discs comprise inner toothings 104, 105 which are positioned in the toothing 101 at the hub 16. The driving disc 102 is axially supported on a step 106 of the hub 16 and the driving disc 103 is axially loaded by a plate spring 107 which is supported on a securing ring 108 inserted into a groove 109 in the hub 16. It can be seen that in this way, only a limited amount of torque can be transmitted between the hub 16 and the rotational member 22. With an increasing relative speed between the rotational member 22 and the housing 20, the shear forces between the rotational member 22 and the fluid in the shear channel 38 are thus limited.

FIGS. 7a, b and c shows the same details as FIG. 2. Instead of screws, there are provided balls 39', 40' constituting the closing means. The enlarged detail also shows that the rotational member 22 is not directly connected to the hub 16 so as to be rotationally fixed, but the inner circumference of the rotational member 22 is provided with an end toothing 111 which can engage a corresponding end toothing 112 of an annular member 113. The annular member 113 comprises inner toothing 114 engaging outer toothing 101 of the hub member 16 in a rotationally fixed way. The rotational member 22 is axially supported on a shoulder 106 of the hub member 16 and the annular member 113 is axially loaded by an annular, e.g. wave-shaped spring element 115 and is supported on a securing ring 108 engaging an annular groove 109 in the hub member 16. As can be seen in FIG. 7c, the end toothings 111, 112 have been provided with inclines which, with an increasing torque, ensure uncoupling against the force of the spring element 115 (at 1), with the tooth shape being such that uncoupling can take place in both directions (at 2) or that uncoupling can take place in only one relative direction of rotation (at 3).

FIGS. 8a–e show a pumping and control member 23 which comprises an annular groove 37 whose end is provided with two control apertures 31, 32 extending parallel to the axis. The annular groove 37 contains a piston plate 121 which is shown in FIG. 8b. Further details of said piston plate 121 in different embodiments are shown in FIGS. 8c and 8d, i.e. cross-section through the annular groove 37, and in FIG. 8e with two different conditions being illustrated in each case.

In accordance with FIG. 8c, the piston plate 121' can be a resilient element which has a U-shaped cross-section and which is deformed with an increasing pressure (at 1), thus increasing the cross-section of the shear channel 38. In this way, the generation of pressure is limited.

With a lower pressure in the shear channel 38, the piston plate 121' assumes its natural U-shaped cross-sectional shape (at 2), as a result of which the effective depth of the shear channel is reduced and the generation of pressure is increased.

In FIG. 8d, the piston plate 121" is again made of a resilient material, but comprises a rigid cross-sectional web and resilient legs 122. With an increasing pressure in the shear channel, said resilient legs 122 are compressed, so that the cross-section of the shear channel is increased, with the effective generation of pressure being reduced due to a greater shear channel thickness (at 1). with a lower relative speed, the piston plate 121" assumes its natural shape (at 2), as a result of which the effective cross-section of the shear channel 38 decreases, with the generation of pressure increasing due to a more effective shear effect at a given relative speed.

FIG. 8e shows the same details as FIG. 8d. FIG. 8e shows the compressed piston plate 121", and shows the piston plate 121" in its natural shape with rebound legs 122.

In FIG. 9a, the rotational stop 41 is in its end position in the circumferentially delimited groove 42 between two end positions which are formed by resilient end stops 201, 202. As a result, the control aperture 31 at one end of the groove 37 is connected to the connecting channel 43 leading to the pressure chamber 21, whereas the second control aperture 33 is connected to the reservoir by the connecting channel 32.

Up to a desired speed differential between the rotatable parts, the resilient end stops 201, 202 can be assumed to be substantially rigid, i.e. the friction forces applied to the groove 37 are not suitable for overcoming the spring forces, so that there exists an exact correlation between the ends of the groove 37 and the apertures 31, 33, as shown, or, in the opposite direction of rotation, between the ends of the groove 37 and the apertures 30 and 31.

In FIG. 9b, the rotational stop 41 is in a changed position which is achieved by the resilience of the rotational end stop 201. As a result, the aperture 31 in the pumping and control member 23 now causes short circuiting of the connection 33 between the reservoir 26 and the connecting channel 43 leading to the pressure chamber 21. At the same time, through the connection with the reservoir 33, the one end of the groove 37, through the aperture 31, is short circuited with the other end of the groove through the aperture 32. In this way, the pressure build-up by means of the groove 37 collapses so that, at the different differential speed, the pressure build-up and thus the torque transferable by the friction coupling is reduced until the end stop 201 again springs back into the position according to FIG. 9a.

Again, in FIG. 10a, the rotational stop in the circumferentially delimited groove 42 is in its end position between two freely reachable end positions formed by the resilient end stops 201, 202, whereas FIG. 10b shows a position which is rotated beyond the end position, with the end stop 201 being resilient. In addition to the details shown in FIG. 9, the housing is provided with two further axial bores 203, 204 which also establish a connection with the reservoir. Two further bores 205, 206 are provided in the pumping and control member 23 inside the annular groove 37. In the freely reachable end positions according to FIG. 10a, which can be reached without compressing the end stops 201, 202 by freely rotating the pumping and control member 23, the apertures do not have any function. In the position as illustrated in FIG. 10b, the resilient end stop 201 is compressed by a small amount relative to the position shown in FIG. 9b. The short circuiting function in the region of the two ends of the groove, as explained with reference to FIG. 9b, does not yet take place. However, the apertures 203, 205 overlap one another, which has a double effect in that the region between the aperture 33 and the aperture 203 is connected to the reservoir at both ends, so that an effective pressure build-up cannot take place here.

However, between the aperture 203 which now serves as a suction aperture out of the reservoir 26 and the channel 43 leading to the pressure chamber 21, there occurs an effective pressure build-up on a substantially reduced channel length, so that the pressure build-up does not collapse completely, but is reduced to part of the channel length. In consequence, the pressure and thus the torque transferable by the friction coupling is limited to a predetermined value. In the opposite direction of rotation and upon rotation of the pumping and control disc relative to the housing, the apertures 204, 206 overlap in the same way. In both directions of relative rotation, a further compression of the end stop 201, 202 causes a situation as described above with reference to FIG. 9b.

Preferred embodiments have been disclosed. A worker of ordinary skill would recognize that modifications would come within the scope of this invention. Thus, the following claims should be studied.

I claim:

1. A coupling device comprising:
    two parts which are coaxially rotatable relative to each other;
    a friction coupling having friction plates which alternately connected to the one and the other of said parts rotatable relative to one another, and an actuating device for said friction coupling, said actuating device comprises an annular chamber formed in one of said rotatable parts and containing a highly viscous fluid;
    a rotational member arranged in said annular chamber, drivingly connected to said other one of said parts rotatable relative to one another, and acting on said highly viscous fluid adhering to said rotational member; and
    said actuating device, causing an increase in pressure for the purpose of loading said friction coupling when said rotatable parts rotate relative to one another for transmitting torque between the rotatable parts; and means for uncoupling the driving connection between said rotational member and said one of said rotatable parts driving said rotational member, for the purpose of limiting the torque transmittable between said two rotatable parts.

2. A coupling device according to claim 1, wherein said means for uncoupling is designed to couple and uncouple automatically as a function of the differential rotational between said rotational member and the annular chamber, or as a function of the pressure in said annular chamber, or as a function of the rotational speed of the rotational member.

3. A coupling device according to claim 1, wherein said means for uncoupling consist of a spring-loaded claw coupling with complementary claws at said rotational member and at said part driving the same.

4. A coupling device according to claim 3, wherein said claw coupling is provided with sliding inclines at said claws, which facilitate automatic uncoupling in at least one direction of relative rotation.

5. A coupling device according to claim 3, wherein said claw coupling is provided with axis parallel locking faces at said claws, which prevent automatic uncoupling in one direction of relative rotation.

6. A coupling device according to claim 3, wherein said spring loading means of said claw coupling or of said slip coupling is adapted to be unloaded as a function of the rotational speed of said rotational member.

7. A coupling device according to any one of claim 1, wherein said means for uncoupling consist of a spring-loaded slip coupling.

8. A coupling device according to claim 1, wherein said uncoupling means consists of a viscous coupling in which said rotational member forms a dragged plate.

9. A coupling device according to claim 1, wherein inside said annular chamber there is arranged a pressure build-up and control member which is rotatable relative to said annular chamber to a limited extent and which is provided with a circumferentially extending annular groove which is delimited by two ends, which is closed by said contacting rotational member and which forms a shear channel with said rotational member, said annular chamber being delimited by a movable piston, wherein there is a reservoir with a variable volume formed in one of said rotatable parts which is hydraulically connected to the annular chamber; and which upon relative rotation of said rotatable parts, one end of said shear channel with a lower fluid pressure is connected to said reservoir, and the other end of said shear channel with a higher fluid pressure is connected to the part of said annular chamber which is delimited by said movable piston.

* * * * *